(12) United States Patent
Cho et al.

(10) Patent No.: US 9,501,162 B2
(45) Date of Patent: *Nov. 22, 2016

(54) DISPLAY DEVICE INTEGRATED WITH TOUCH SCREEN PANEL AND DRIVING METHOD THEREOF

(71) Applicant: Samsung Display Co., Ltd., Yongin, Gyeonggi-Do (KR)

(72) Inventors: Se-Il Cho, Yongin (KR); Sang-Hyun Jun, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 131 days.

This patent is subject to a terminal disclaimer.

(21) Appl. No.: 14/185,900

(22) Filed: Feb. 20, 2014

(65) Prior Publication Data

US 2014/0253502 A1   Sep. 11, 2014

(30) Foreign Application Priority Data

Mar. 7, 2013   (KR) .................. 10-2013-0024310

(51) Int. Cl.
*G06F 3/041*     (2006.01)
*G06F 3/044*     (2006.01)

(52) U.S. Cl.
CPC ............. *G06F 3/0412* (2013.01); *G06F 3/044* (2013.01); *G06F 3/0416* (2013.01)

(58) Field of Classification Search
CPC .................. G06F 3/041; G06F 3/0412; G06F 3/0416; G06F 3/044; G06F 3/047;
(Continued)

(56) References Cited

U.S. PATENT DOCUMENTS 8,035,581 B2   10/2011  Choi
8,373,687 B2    2/2013  Kwon
(Continued)

FOREIGN PATENT DOCUMENTS

JP      2009-258182 A     11/2009
KR  10-2006-0112994       11/2006
(Continued)

OTHER PUBLICATIONS

U.S. Notice of Allowance dated Jun. 22, 2015, for cross reference U.S. Appl. No. 14/024,218, (14 pages).

*Primary Examiner* — Nathan Danielsen
(74) *Attorney, Agent, or Firm* — Lewis Roca Rothgerber Christie LLP

(57) ABSTRACT

A display device integrated with a touch screen panel includes a display unit in which scan lines and data lines crossing each other, and pixels are arranged, wherein the pixels are positioned at crossing regions of the scan lines and the data lines and each of the pixels comprises first and second pixel electrodes, first touch electrodes extending along a first direction on the display unit, and second touch electrodes extending along a second direction on the display unit, and arranged to overlap the first touch electrodes, the second touch electrodes being spaced apart from the first touch electrodes, wherein the first touch electrodes are implemented by patterning the second pixel electrode in the first direction, and wherein while a touch driving signal is supplied to one or more first touch electrodes among the first touch electrodes, a second pixel power source is supplied to remaining first touch electrodes.

13 Claims, 6 Drawing Sheets

(58) Field of Classification Search
CPC ................................ G06F 2203/04107; G09G 3/30–3/3291; G09G 2300/0421; G09G 2300/0426
See application file for complete search history.

(56) References Cited

U.S. PATENT DOCUMENTS

| | | | |
|---|---|---|---|
| 8,878,802 B2* | 11/2014 | Azumi | ................... G06F 3/041 345/104 |
| 2006/0139266 A1* | 6/2006 | Choi | ................... G09G 3/3233 345/77 |
| 2006/0248421 A1 | 11/2006 | Choi | |
| 2008/0062147 A1 | 3/2008 | Hotelling et al. | |
| 2008/0218650 A1 | 9/2008 | Koshihara et al. | |
| 2009/0256818 A1 | 10/2009 | Noguchi et al. | |
| 2010/0111466 A1 | 5/2010 | Doerr et al. | |
| 2011/0084955 A1 | 4/2011 | Kim | |
| 2011/0122096 A1* | 5/2011 | Kim | ...................... G06F 3/0412 345/175 |
| 2011/0216056 A1 | 9/2011 | Yoo et al. | |
| 2012/0086879 A1 | 4/2012 | Yu et al. | |
| 2012/0105752 A1 | 5/2012 | Park et al. | |
| 2012/0212517 A1 | 8/2012 | Ahn | |
| 2012/0218482 A1 | 8/2012 | Hwang et al. | |
| 2012/0256861 A1 | 10/2012 | Park | |
| 2012/0256971 A1 | 10/2012 | Shin et al. | |
| 2013/0057511 A1 | 3/2013 | Shepelev et al. | |
| 2013/0321292 A1 | 12/2013 | Jeon | |
| 2013/0341651 A1 | 12/2013 | Kim et al. | |
| 2013/0342479 A1 | 12/2013 | Pyo et al. | |
| 2014/0049508 A1 | 2/2014 | Kim et al. | |
| 2014/0085222 A1 | 3/2014 | Park et al. | |
| 2014/0111446 A1 | 4/2014 | Lee et al. | |
| 2014/0160061 A1 | 6/2014 | Kim et al. | |
| 2014/0210767 A1 | 7/2014 | Hur | |

FOREIGN PATENT DOCUMENTS

| | | |
|---|---|---|
| KR | 10-2012-0045992 A | 5/2012 |
| KR | 10-2012-0094734 | 8/2012 |
| KR | 10-2012-0097761 A | 9/2012 |

\* cited by examiner

DISPLAY DEVICE INTEGRATED WITH TOUCH SCREEN PANEL AND DRIVING METHOD THEREOF

CROSS-REFERENCE TO RELATED APPLICATION

This application claims priority to and the benefit of Korean Patent Application No. 10-2013-0024310, filed on Mar. 7, 2013, in the Korean Intellectual Property Office, the content of which is incorporated herein by reference in its entirety.

BACKGROUND

1. Field

The following description relates to a display device integrated with a touch screen panel and a driving method thereof.

2. Description of the Related Art

A touch screen panel is an input device that enables a user's instruction (or command) to be input by selecting an instruction content displayed on a screen of a display device such as a liquid crystal display or organic light emitting display with a user's finger(s) (or hand) or an object.

To this end, the touch screen panel is formed on a front face of the display device to convert a contact position of a user's finger(s) or object into an electrical signal. The user's finger or an object is directly in contact with the touch screen panel at the contact position. Accordingly, the instruction content selected at the contact position is input as an input signal to the image display device.

Because such a touch screen panel can be substituted for a separate input device coupled (or connected) to a display device, such as a keyboard or mouse, its areas of application have been gradually extended.

SUMMARY

Aspects of the embodiments of the present invention are directed toward a display device integrated with a touch screen panel and a driving method thereof, in which an electrode provided in a pixel to display an image is also used as an electrode of the touch screen panel, thereby simplifying the structure of the display device, and the touch screen panel is concurrently driven (e.g., simultaneously driven) during a period in which an image is displayed, so that it is possible to make efficient use of system time and to secure (or leave aside) sufficient driving time.

According to an embodiment of the present invention, there is provided a display device integrated with a touch screen panel, including: a display unit in which scan lines and data lines crossing each other, and a plurality of pixels are arranged, wherein the plurality of pixels are positioned at crossing regions of the scan lines and the data lines and each of the plurality of pixels includes first and second pixel electrodes; first touch electrodes extending along a first direction on the display unit; and second touch electrodes extending along a second direction on the display unit, and arranged to overlap the first touch electrodes, the second touch electrodes being spaced apart from the first touch electrodes, wherein the first touch electrodes are implemented by patterning the second pixel electrode in the first direction, and wherein while a touch driving signal is supplied to one or more first touch electrodes among the first touch electrodes, a second pixel power source is supplied to remaining first touch electrodes of the first touch electrodes.

In one embodiment, the display device further includes emission control lines formed in parallel with the scan lines.

In one embodiment, the emission control lines coupled to pixels at a region in which a same one of first touch electrode of the first touch electrodes receiving the touch driving signal is disposed, supply, to the pixels, emission controls signal for controlling the pixels not to emit light during at least a period in which the touch driving signal is supplied.

In one embodiment, the first touch electrodes extend along a same direction as the scan lines and the emission control lines, and the first touch electrodes overlap with a plurality of pixel lines on which the scan lines and the emission control lines are arranged.

In one embodiment, emission control signals for controlling the pixels not to emit light are sequentially shifted and supplied to the emission control lines, and the emission control signals supplied to the emission control lines arranged at a region in which a same one of the first touch electrodes is formed are supplied to be partially overlapped in time, with each other, during at least a period in which the touch driving signal is supplied to the same one of the first touch electrode.

In one embodiment, the emission control lines arranged at the region in which a same one of the first touch electrodes is formed concurrently receive a same emission control signal.

In one embodiment, the emission control lines arranged at the region in which a same one of the first touch electrodes is formed are electrically coupled to each other.

In one embodiment, each pixel is configured to include at least one organic light emitting diode, and the first and second pixel electrodes are anode and cathode electrodes of the organic light emitting diode, respectively.

In one embodiment, each of the anode electrodes is divided and patterned for each pixel, and each of the cathode electrodes is divided and patterned for each first touch electrode.

In one embodiment, a first pixel power source is supplied to a first pixel electrode, and the second pixel power source and the touch driving signal are alternately supplied to the second pixel electrode.

In one embodiment, a presence and position of a touch input are sensed by detecting a change in capacitance applied to the second touch electrodes, corresponding to the touch driving signal supplied to the first touch electrodes.

According to an embodiment of the present invention, there is provided a driving method of a display device integrated with a touch screen panel, which displays an image by using a pixel electrode provided in each pixel of a plurality of pixels as a first touch electrode for touch driving, selecting pixels of the plurality of pixels for each line while supplying a scan signal to scan lines, writing a data signal in the selected pixels while supplying the data signal to data lines when the scan signal is supplied, and controlling an emission period of the pixels while supplying emission control signals to emission control lines formed in parallel with the scan lines, the driving method including: sequentially supplying a touch driving signal to first touch electrodes formed in a same direction as the scan lines and the emission control lines; and sensing a presence and position of a touch input by detecting a change in capacitance applied to second touch electrodes spaced apart from the first touch electrodes when the touch driving signal is supplied, wherein a pixel power source is supplied to the first touch electrodes, except for a first touch electrode of the first touch electrodes to which the touch driving signal is supplied.

In one embodiment, the emission control signals for controlling the pixels not to emit light through the emission control lines are supplied to the pixels at a region in which the first touch electrode receiving the touch driving signal is formed.

In one embodiment, each first touch electrode overlaps with a plurality of pixel lines on which the scan lines and the emission control lines are arranged, the emission control signals for controlling the pixels not to emit light are sequentially shifted and supplied to the emission control lines, and the emission control signals supplied to emission control lines arranged at a region in which the first touch electrode receiving the touch driving signal is formed are supplied to be partially overlapped in time, with each other, during at least a period in which the touch driving signal is supplied.

In one embodiment, each first touch electrode overlaps with a plurality of pixel lines on which the scan lines and the emission control lines are arranged, and the emission control signals for controlling the pixels not to emit light is concurrently supplied to the emission control lines arranged at a region in which a same one of the first touch electrode is formed.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
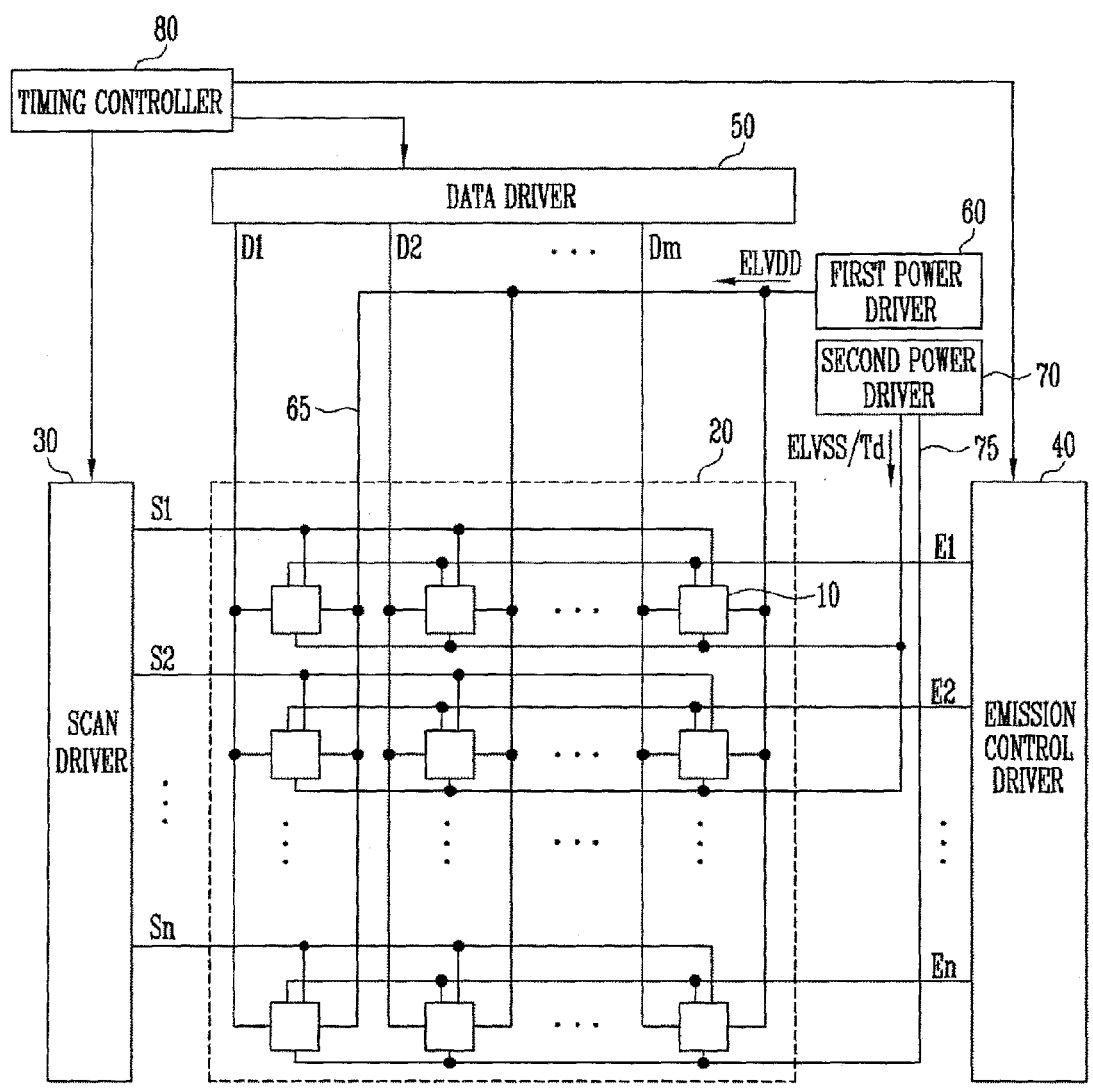
FIG. 1 is a block diagram illustrating a display unit and a driving circuit for driving the display unit in a display device integrated with a touch screen panel, according to an example embodiment of the present invention.
Figure 2:
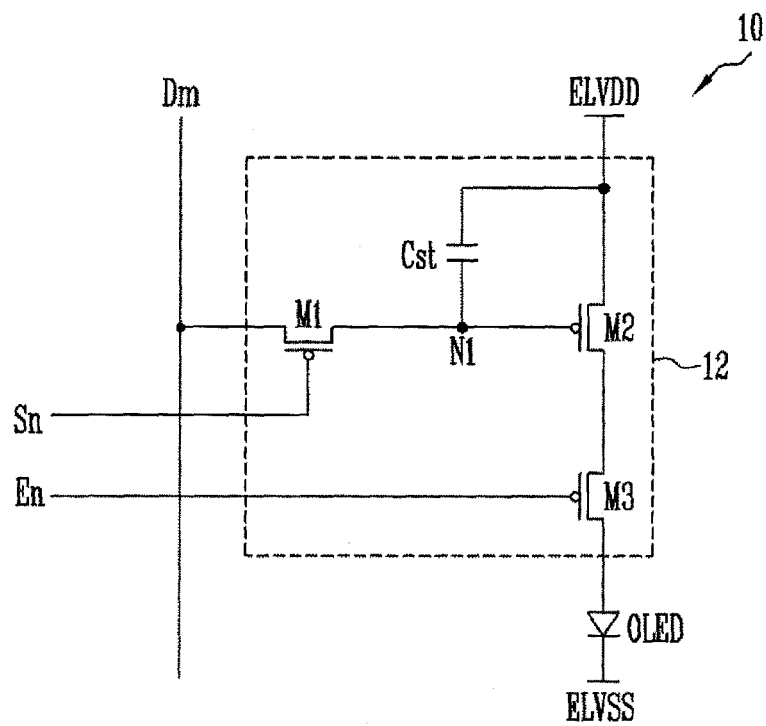
FIG. 2 is a circuit diagram illustrating an example of a pixel shown in FIG. 1, according to an example embodiment of the present invention.

FIG. 1 is a block diagram illustrating a display unit and a driving circuit for driving the display unit in a display device integrated with a touch screen panel, according to an example embodiment of the present invention. FIG. 2 is a circuit diagram illustrating an example of a pixel shown in FIG. 1, according to an example embodiment of the present invention. For convenience of illustration, the structure of a pixel coupled to an n-th scan line Sn, an n-th emission control line En and an m-th data line Dm will be shown in FIG. 2.

First, referring to FIG. 1, the display device integrated with the touch screen panel, according to an embodiment, includes a display unit 20, a scan driver 30, an emission control driver 40, a data driver 50, a first power driver 60, a second power driver 70, and a timing controller 80.

The display unit 20 includes scan lines S1 to Sn and data lines D1 to Dm, which cross (or intersect) each other, emission control lines E1 to En formed in parallel with the scan lines S1 to Sn, and a plurality of pixels 10 arranged at crossing regions (or intersection portions) of the scan lines S1 to Sn, the data lines D1 to Dm and the emission control lines E1 to En. (Hereinafter, n and m represent positive integers that may or may not be the same).

For example, each pixel 10, as shown in FIG. 2, includes an organic light emitting diode OLED and a pixel circuit 12 for driving the organic light emitting diode OLED.

An anode electrode of the organic light emitting diode OLED is coupled to a first pixel power source ELVDD via the pixel circuit 12, and a cathode electrode of the organic light emitting diode OLED is coupled to a second pixel power source ELVSS. The organic light emitting diode OLED emits light with luminance corresponding to driving current supplied from the pixel circuit 12. Each pixel 10 includes a first pixel electrode and a second pixel electrode. For example, the first pixel electrode is set as an anode electrode to which the first pixel power source ELVDD is supplied, and the second pixel electrode is set as a cathode electrode to which the second pixel power source ELVSS is supplied.

The pixel circuit 12 may be configured to include first to third transistors M1 to M3 and a storage capacitor Cst.

A first electrode of the first transistor M1 is coupled to the data line Dm, and a second electrode of the first transistor M1 is coupled to a first node N1. The first and second electrodes are electrodes different from each other. For example, if the first electrode is set as a source electrode, the second electrode is set as a drain electrode. A gate electrode of the first transistor M1 is coupled to the scan line Sn. When a scan signal having a voltage (e.g., a low voltage) at which the first transistor M1 can be turned on is supplied from the scan line Sn, the first transistor M1 is turned on, so that the data line Dm and the first node N1 are coupled to each other. In this embodiment, a data signal of the corresponding pixel 10 is supplied to the data line Dm. Accordingly, the data signal is transmitted to the first node N1. The data signal transmitted to the first node N1 is charged in the storage capacitor Cst.

A first electrode of the second transistor M2 is coupled to the first pixel power source ELVDD, and a second electrode of the second transistor M2 is coupled to the anode electrode of the organic light emitting diode OLED via the third transistor M3. A gate electrode of the second transistor M2 is coupled to the first node N1. The second transistor M2 controls the amount of the driving current supplied to the organic light emitting diode OLED, based on the voltage at the first node N1.

A first electrode of the third transistor M3 is coupled to the second electrode of the second transistor M2, and a second electrode of the third transistor M3 is coupled to the anode electrode of the organic light emitting diode OLED. A gate electrode of the third transistor M3 is coupled to the emission control line En. The third transistor M3 is turned off during a non-emission period in which an emission control signal having a voltage (e.g., a high voltage) at which the third transistor M3 can be turned off is supplied from the emission control line En, so as to block the driving current from flowing through the organic light emitting diode OLED. The third transistor M3 is turned on during an emission period in which the supply of the emission control signal is stopped, so as to allow the driving current from the second transistor M2 to the organic light emitting diode OLED. That is, the emission control signal is supplied to control the electrical connection between the pixel circuit 12 and the organic light emitting diode OLED. The emission control signal blocks the driving current from the pixel circuit 12 from flowing through the organic light emitting diode OLED during a non-emission period (e.g., a predetermined non-emission period), such as, a data writing period.

One electrode of the storage capacitor Cst is coupled to the first pixel power source ELVDD, and the other electrode of the storage capacitor Cst is coupled to the first node N1. The storage capacitor Cst charges a voltage corresponding to the data signal supplied to the first node N1 in one frame, and maintains the charged voltage until a data signal of the next frame is written.

Meanwhile, for convenience, a relatively simple structure of the pixel 10 including the first transistor M1 and storage capacitor Cst for writing and storing a data signal, the second transistor M2 for supplying, to the organic light emitting diode OLED, driving current corresponding to the data signal, and the third transistor M3 for controlling the emission period of the pixel 10 has been shown in FIG. 2. However, this is merely one embodiment for illustrating the present invention, and the present invention is not limited thereto. Practically, the pixel circuit 12 may further include other circuit elements such as a transistor element for compensating for the threshold voltage of the second transistor M2 and a transistor element for initializing the first node N1.

As such, the pixel 10 is selected by the scan signal supplied from the scan line Sn during the scan period of a corresponding horizontal line so as to receive the data signal supplied from the data line Dm, and the emission period of the pixel 10 is controlled, according to the emission control signal supplied from the emission control line En.

In this embodiment, the current path of the driving current is blocked in the pixel 10 by disabling (or cutting off) the electrical coupling (or connection) between the second transistor M2 and the organic light emitting diode OLED during the non-emission period, in which the emission control signal for turning off the third transistor M3 is supplied. During the emission period in which the third transistor M3 is turned on, the organic light emitting diode OLED emits light with luminance corresponding to the data signal (although, the OLED does not emit light when a data signal for displaying black is supplied) by enabling the current path of the driving current from the first pixel power source ELVDD to the second pixel power source ELVSS via the second transistor M2, the third transistor M3 and the organic light emitting diode OLED.

Referring back to FIG. 1, the scan driver 30 selects a pixel line (e.g., a horizontal pixel line) to receive a data signal supplied for each period (e.g., horizontal period) in one frame while supplying scan signals to the scan lines S1 to Sn. To this end, the scan driver 30 may sequentially (or progressively) select the scan signals S1 to Sn while supplying, for example, a sequentially (or progressively) shifted scan signal to the scan lines S1 to Sn.

The emission control driver 40 controls the emission of pixels 10 for at least each pixel line while supplying an emission control signal to the emission control lines E1 to En. For example, the emission control driver 40 prevents or blocks the pixels 10 from emitting light by supplying the emission control signal to the emission control line E of the corresponding pixel line during a non-emission period (e.g., a predetermined non-emission period) including a data writing period of each pixel line.

Meanwhile, the emission control driver 40 may also direct (or control) the pixels 10 receiving the emission control signal to not emit light while sequentially supplying, for example, a sequentially shifted emission control signal to the emission control lines E1 to En. In this embodiment, emission control signals supplied to a plurality of emission control lines E is supplied to be partially overlapped with each other.

The emission control driver 40 may concurrently supply (e.g., simultaneously supply) the same emission control signal to a plurality of emission control lines E. In this embodiment, the plurality of emission control lines E are electrically coupled to one another.

The operation of the emission control driver 40 may be controlled in connection with driving of the touch screen panel. This will be described in detail later.

The data driver 50 generates a data signal, corresponding to data transmitted from the timing controller 80, and supplies the generated data signal to the pixels 10 through the data lines D1 to Dm.

The first power driver 60 supplies the first pixel power source ELVDD to each pixel 10 through a first power line 65. For example, the first power driver 60 is implemented as a DC-DC converter for converting power supplied from the outside into the first pixel power source ELVDD.

The second power driver 70 supplies the second pixel power source ELVSS or a touch driving signal Td to each pixel 10 through a second power line 75. In an embodiment of the present invention, the second power line 75 is coupled to first touch electrodes described later, and is divided into a plurality of power lines so that the touch driving signal Td is supplied to the first touch electrodes in different periods. In this embodiment, the first touch electrodes is implemented by patterning any one of the first and second pixel electrodes, e.g., the second pixel electrode (cathode electrode). In this embodiment, the second pixel power source ELVSS and the touch driving signal Td is alternately supplied to the second pixel electrode. For example, the second pixel power source ELVSS are supplied to the second pixel electrode during the emission period of a corresponding pixel 10, and the touch driving signal Td are supplied to the second pixel electrode during at least one portion of the non-emission period of the pixel 10.

The timing controller 80 controls the scan driver 30, the emission control driver 40 and the data driver 50, corresponding to a control signal supplied from the outside thereof. The timing controller 80 may additionally control the first power driver 60 and/or the second power driver 70.

Figure 3:
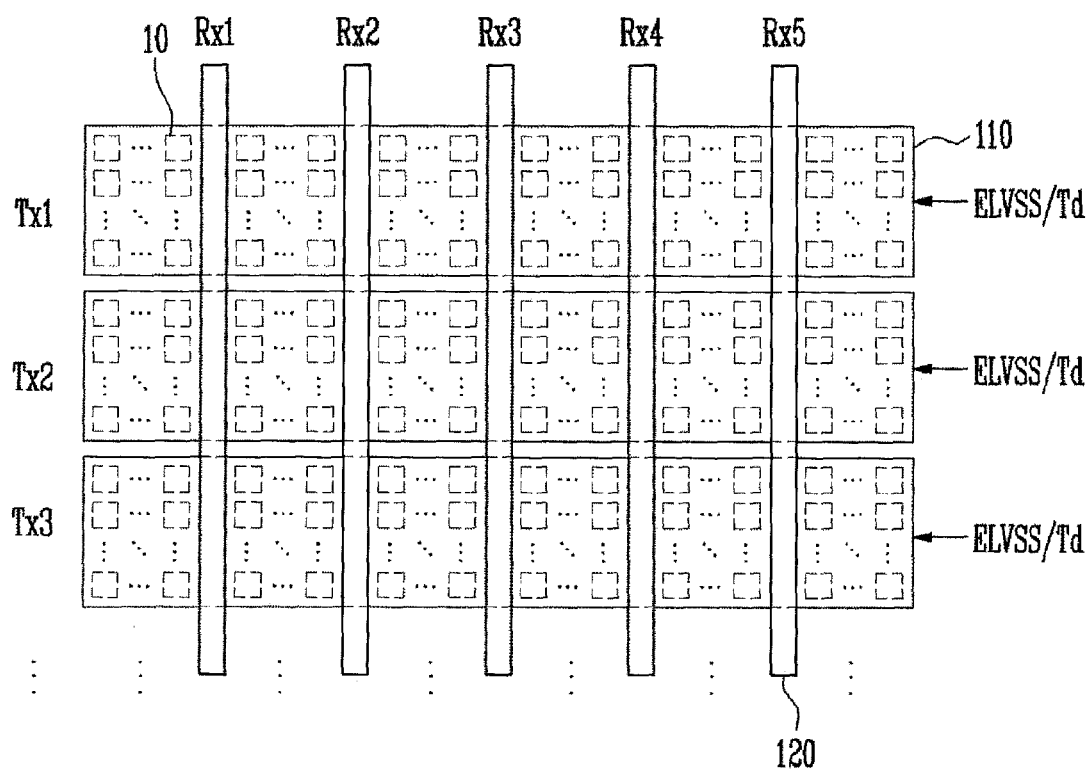
FIG. 3 is a diagram illustrating touch electrodes of the display device integrated with the touch screen panel, according to an example embodiment of the present invention.
Figure 4:
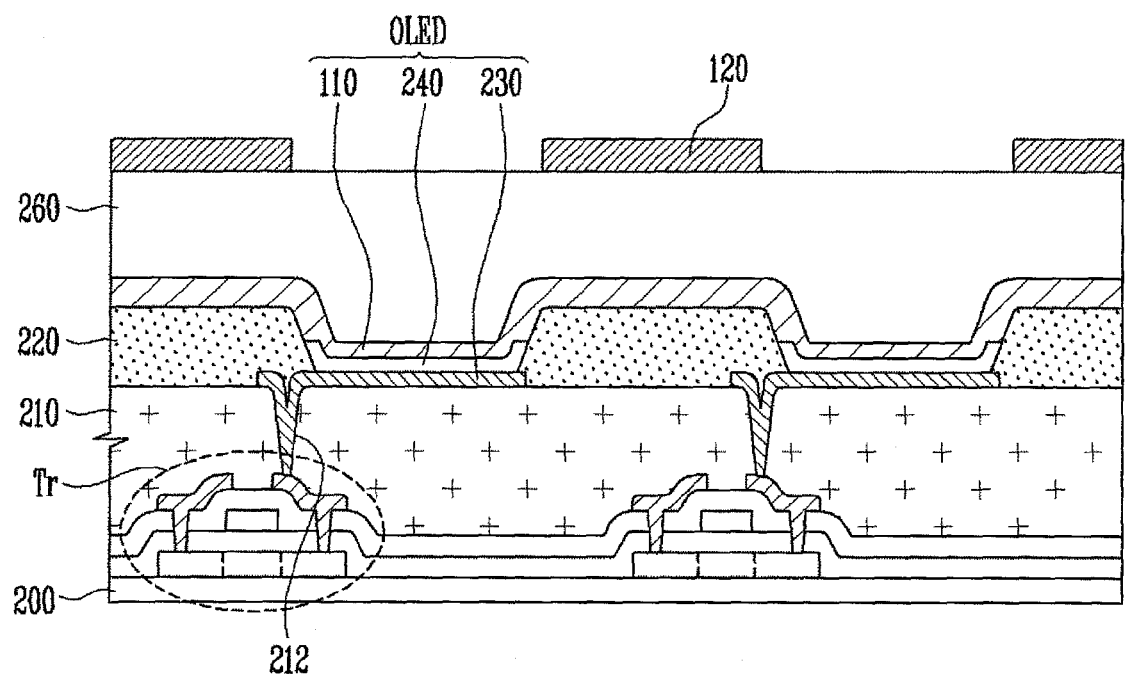
FIG. 4 is a partial sectional view of the display device integrated with the touch screen panel, according to an example embodiment of the present invention.

FIG. 3 is a diagram illustrating touch electrodes of the display device integrated with the touch screen panel, according to an example embodiment of the present invention. FIG. 4 is a partial sectional view of the display device integrated with the touch screen panel, according to an embodiment of the present invention. For convenience, it has been illustrated in FIG. 4 that a second touch electrode 120 is formed for each vertical pixel line of the display unit. However, this is merely for the purpose that the position of the second touch electrode 120 is clearly represented, and the present invention is not limited thereto. For example, one second touch electrode 120, as shown in FIG. 3, is disposed for every plural vertical pixel lines. While a capacitive touch screen panel is shown, as an example, in FIGS. 3 and 4, the technical spirit of the present invention is not necessarily limited thereto.

First, referring to FIG. 3, the touch electrodes for implementing the touch screen panel include first touch electrodes 110 formed along a first direction (e.g., a horizontal direction), and second touch electrodes 120 formed along a second direction (e.g., a vertical direction) crossing the first direction. The first touch electrodes 110 and the second touch electrodes 120 may overlap (or be disposed opposite to each other) while being spaced apart, thereby forming capacitance.

For example, the first touch electrodes 110 are set as Tx electrodes that receive a touch driving signal Td, and the second touch electrodes 120 are set as Rx electrodes that detect a change in capacitance via the touch driving signal Td.

In this embodiment, the touch driving signal Td is set as, for example, a square wave swinging between first and second voltages. The touch screen panel is implemented as a mutual capacitive touch screen panel that senses the presence and position of a touch by detecting a change in capacitance at the second touch electrodes 120 when the voltage of the touch driving signal Td supplied to the first touch electrodes 110 is changed.

The first and second touch electrodes 110 and 120 may be formed on the display unit in which an image is displayed. That is, the pixels 10 are arranged beneath the first and second touch electrodes 110 and 120. Therefore, the first and second touch electrodes 110 and 120 are, in one embodiment, transparent so that light emitted from the pixels 10 can be transmitted therethrough. To this end, the first and second touch electrodes 110 and 120 may be formed of a transparent conductive material, but the present invention is not limited thereto. For example, the first and second touch electrodes 110 and 120 are formed of other conductive materials such as opaque metal, of which thickness, width, or pattern is controlled. For example, the first and second touch electrodes 110 and 120 are formed of indium tin oxide (ITO), indium zinc oxide (IZO), graphene, carbon nano tube (CNT), silver nanowires (AgNWs) and/or the like.

Meanwhile, each of the first and second touch electrodes 110 and 120 may be provided in plural numbers so as to have accuracy with which a touch input can be recognized (e.g., sufficiently recognized). It is unnecessary that each of the first and second touch electrodes 110 and 120 should be provided for each horizontal or vertical line of the pixels 10.

For example, the first touch electrodes 110 are arranged to be overlapped with a plurality of horizontal pixel lines. In this embodiment, the first touch electrodes 110 are formed in the same direction as the scan lines S1 to Sn and the emission control lines E1 to En, shown in FIG. 1. Each first touch electrode 110 may be formed to be overlapped with a plurality of horizontal pixel lines on which a plurality of scan lines S and a plurality of emission control lines E are arranged.

One second touch electrode 120 may also be disposed for every plural vertical pixel lines. Meanwhile, an example in which the second touch electrodes 120 are arranged not to be overlapped with the pixels 10 has been illustrated in FIG. 3, but the present invention is not thereby limited and the second touch electrodes 120 may be arranged to be overlapped with the pixels 10 when the transparency of the second touch electrodes 120 are secured (e.g., sufficiently secured).

In an embodiment of the present invention, at least a portion of the touch electrodes 110 and 120, e.g., the first touch electrodes 110 are integrally formed with the pixel electrodes provided in the pixels 10.

For example, the first touch electrodes 110 is implemented by patterning the second electrodes provided in the pixels in the first direction.

The structure of the pixel 10 will now be described. The pixel 10, as shown in FIG. 4, includes an organic light emitting diode OLED and a transistor Tr (e.g., the third transistor M3 of FIG. 2) coupled to the organic light emitting diode OLED. For convenience, only the organic light emitting diode OLED and the transistor Tr directly coupled to the organic light emitting diode OLED will be shown in FIG. 4.

The transistor Tr is formed on a substrate 200 made of glass, plastic, silicon and/or synthetic resin, and a planarization layer 210 is formed on the transistor Tr.

The planarization layer 210 may be formed of an insulation material such as nitride or oxide.

A first pixel electrode (anode electrode) 230 coupled to the transistor Tr through a contact hole 212 is formed on the planarization layer 210, and an emission layer 240 and a second pixel electrode (cathode electrode) 110 are sequentially stacked on the first pixel electrode 230, thereby constituting the organic light emitting diode OLED.

Meanwhile, the first pixel electrode 230 may be patterned to be divided for each pixel 10, and a pixel defining layer 220 may be formed between adjacent pixels. The pixel defining layer 220 may be made of any one of an acrylic organic compound and an organic insulation material such as polyamide or polyimide, but the present invention is not limited thereto. That is, the pixel defining layer 220 may be formed of various suitable insulation materials.

The second pixel electrode 110 is not necessarily separated and patterned only for the purpose of displaying an image. However, in this embodiment, the second pixel electrode 110 is integrally implemented with the first touch electrode 110. The second pixel electrode 110 may be arranged in plural numbers along the second direction by being divided into a plurality of patterns and patterned to extend along the first direction so that the first touch electrodes 110 can be configured as shown in FIG. 3. That is, the second pixel electrode 110 may be divided and patterned for each first touch electrode.

The second pixel electrode 110 serves as a cathode electrode by receiving the second pixel power source ELVSS during the emission period of the pixel 10, and serves as a first touch electrode by receiving the touch driving signal Td during at least one portion of the non-emission period of the pixel 10. That is, the second pixel power source ELVSS and the touch driving signal Td may be alternately supplied to the second pixel electrode 110.

An insulation member 260 is formed on the second pixel electrode 110, and second touch electrodes 120 are formed on the insulation member 260. Here, the insulation member 260 allows the second pixel electrode 110, serving as a first touch electrode, and the second touch electrodes 120 to be spaced apart (e.g., stably spaced apart) from each other. Although it has been illustrated in FIG. 4 that the insulation member 260 is formed as a continuous plane, the present invention is not necessarily limited thereto. For example, the insulation member 260 is formed as a plurality of strips or spacers.

The second touch electrodes 120, as shown in FIG. 3, are formed in a strip (or long shaped) pattern to extend along the second direction so as to cross (e.g. intersect) the first touch electrodes 110. For example, the second touch electrodes 120 are located (or disposed) on the pixel defining layer 220 that is a non-emission region.

As described above, in the display device integrated with the touch screen panel, according to an embodiment of the present invention, the pixel electrode (e.g., the second pixel electrode) 110 provided in the pixel 10 for the purpose of displaying an image is patterned to serve as a touch electrode (e.g., a first touch electrode) for implementing the touch screen panel. Accordingly, it is possible to provide a display device integrated with a touch screen panel, which has a simplified structure.

The display device integrated with the touch screen panel, according to an embodiment of the present invention, senses the presence and position of a touch by detecting a change in capacitance applied to the second touch electrodes 120 while sequentially supplying the touch driving signal Td to the first touch electrodes. In this embodiment, the second pixel power source ELVSS is supplied to the other first touch electrodes, except for the first touch electrode receiving the touch driving signal Td during a corresponding period, among the first touch electrodes 110, so that the other first touch electrodes serve as pixel electrodes.

Thus, the touch screen panel can be concurrently (or concurrently) driven during the period for displaying an image, thereby improving efficiency of time utilization. Accordingly, the touch screen panel can be more stably driven by securing (e.g., sufficiently securing) driving time of the touch screen panel.

The driving method of the display device integrated with the touch screen panel, according to an embodiment of the present invention, will be described in more detail with reference to embodiments shown in FIGS. 5 to 7.

Figure 5:
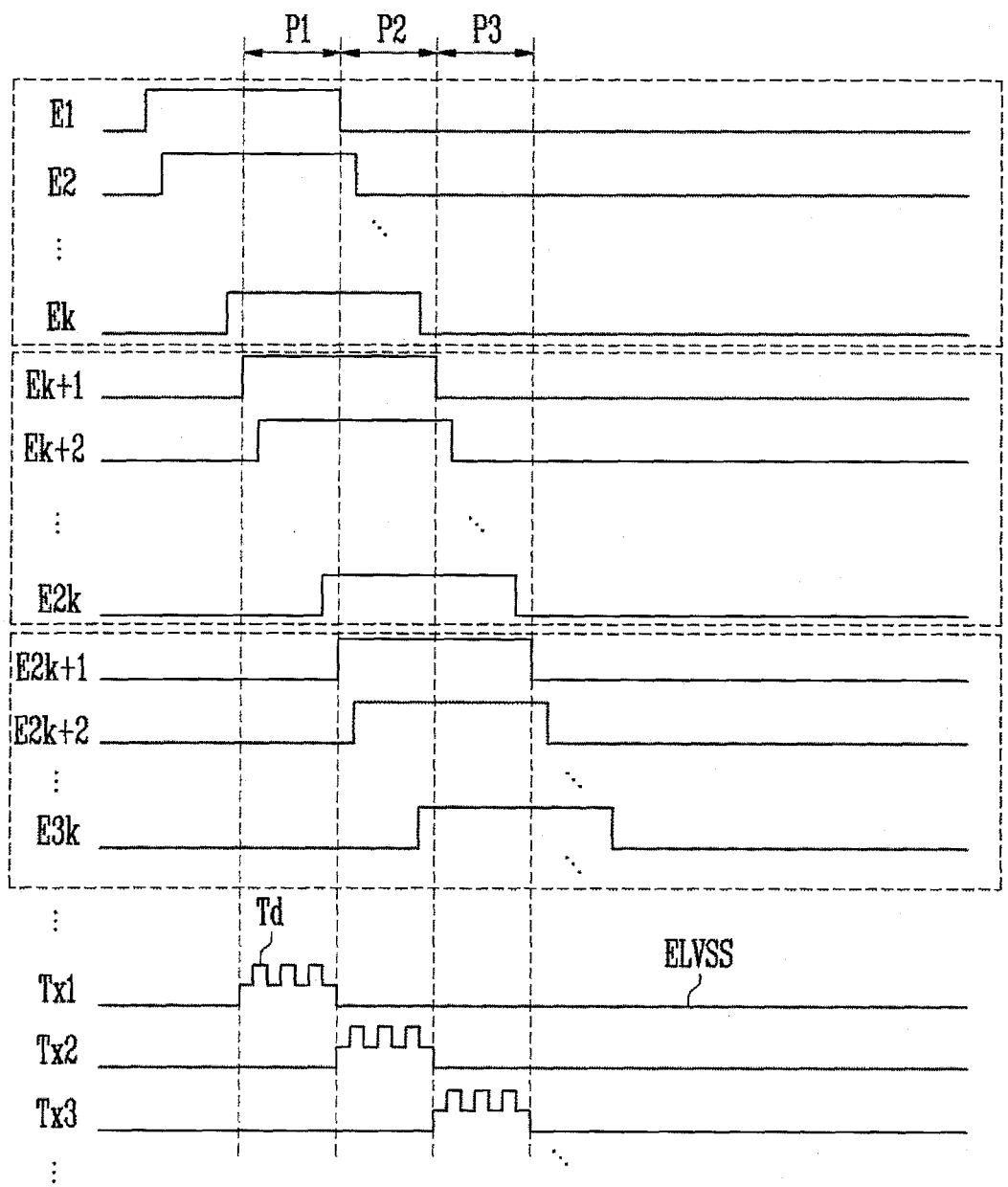
FIG. 5 is a waveform diagram illustrating a driving method of the display device integrated with the touch screen panel, according to an example embodiment of the present invention.

FIG. 5 is a waveform diagram illustrating a driving method of the display device integrated with the touch screen panel, according to an embodiment of the present invention.

Referring to FIG. 5, an emission control signal having a high voltage for controlling the pixels to not emit light is sequentially shifted and supplied to emission control lines E1, E2, etc. In this embodiment, the emission control signals are shifted and supplied to be partially overlapped with each other.

Particularly, the emission control signals supplied to emission control lines E1 to Ek, Ek+1 to E2k, . . . (arranged on a region in which the same first touch electrode Tx is formed) are supplied to be overlapped with each other during at least one period in which a touch driving signal Td is supplied to the corresponding first touch electrode Tx.

That is, the emission control line E coupled to pixels on the region in which the first touch electrode Tx receiving the touch driving signal Td is formed supplies, to the pixels, an emission control signal for controlling the pixels not to emit light during at least one period in which the touch driving signal Td is supplied.

For example, during a first period P1 in which the touch driving signal Td is supplied to a first touch electrode Tx1 (located (or disposed) on a first horizontal line of the horizontal lines of the first touch electrodes Tx), the emission control lines E1 to Ek of pixels overlapping with the first touch electrode Tx1 supply, to the pixels, an emission control signal for controlling the pixels coupled thereto to not emit light.

During a second period P2 in which the touch driving signal Td is supplied to a first touch electrode Tx2, located (or disposed) on a second horizontal line based on the horizontal line for each first touch electrode Tx, the emission control lines Ek+1 to E2k of pixels overlapping with the first touch electrode Tx2 supply, to the pixels, an emission control signal for controlling the pixels coupled thereto to not emit light.

During a third period P3 in which the touch driving signal Td is supplied to a first touch electrode Tx3, located (or disposed) on a third horizontal line based on the horizontal line for each first touch electrode Tx, the emission control lines E2k+1 to E3k of pixels overlapping with the first touch electrode Tx3 supply, to the pixels, an emission control signal for controlling the pixels coupled thereto to not emit light.

By repeating the process described above, the touch driving signal Td can be sequentially supplied to all the first touch electrodes Tx.

Here, the current path of driving current in each pixel is not formed during the non-emission period in which the emission control signal is supplied to the pixels. Therefore, the touch driving signal Td may be supplied to the cathode electrode of the organic light emitting diode OLED.

Meanwhile, during a period in which the touch driving signal Td is supplied to one or more of the first touch electrodes Tx, the second pixel power source ELVSS is supplied to the other first touch electrodes, except for the first touch electrode receiving the touch driving signal Td in the corresponding period, among the first touch electrodes. Accordingly, the second pixel power source ELVSS is supplied to the cathode electrode of the organic light emitting diode OLED during the emission period of pixels, so that the pixels are normally driven, thereby displaying an image.

According to an embodiment of the present invention, and as shown in FIGS. 1 to 4, an image is displayed by selecting pixels 10 for each line while supplying a scan signal to the scan lines S1 to Sn; writing a data signal in the selected pixels 10 while supplying the data signal to the data lines D1 to Dm, when the scan signal is supplied; and controlling the emission period of the pixels while supplying an emission control signal to the emission control lines E1 to En formed in parallel with the scan lines S1 to Sn. Accordingly, it is possible to provide a display device integrated with a touch screen panel, in which the pixel electrode (e.g., the second pixel electrode) provided in each pixel 10 is used as the first touch electrode for touch driving. Therefore, the period for image display and the period for touch driving may not be time-divisionally divided, rather, the image display and the touch driving can be implemented at the same time.

To this end, the driving method of the display device integrated with the touch screen panel includes sequentially supplying a touch driving signal Td to a plurality of first touch electrodes Tx1, Tx2, . . . , formed in the same direction as the scan lines S1 to Sn and the emission control lines E1 to En, and sensing the presence and position of a touch by detecting a change in capacitance at the second touch electrodes Rx1, Rx2, . . . , which are spaced apart from one another to cross the first touch electrodes Tx1, Tx2, . . . when the touch driving signal Td is supplied. In the driving method, the pixel power source (e.g., the second pixel power source ELVSS) is supplied to the other first touch electrodes, except for the first touch electrode to which the touch driving signal Td is supplied during a corresponding period, among the first touch electrodes Tx1, Tx2, . . . .

The presence and position of a touch is sensed by sequentially supplying the touch driving signal Td to the first touch electrodes Tx, and the second pixel power source ELVSS is supplied to the other touch electrodes, except for the first touch electrode receiving the touch driving signal Td during the corresponding period, among the first touch electrodes Tx, so that the other touch electrodes serve as second pixel electrodes, thereby concurrently or simultaneously driving the touch screen panel during a period in which an image is displayed. Accordingly, it is possible to improve or increase the efficiency of time utilization and to secure (or sufficiently secure) time required to charge the first touch electrodes Tx, thereby securing sufficient driving time for stably driving the touch screen panel.

Although it has been illustrated in FIG. 5 that the emission control signal having a high voltage, which directs the pixels to not emit light as each emission control line E1, E2, . . . is sequentially shifted and supplied, the present invention is not necessarily limited thereto.

For example, the same emission control signal is concurrently supplied to a plurality of emission control lines E. This will be described in detail with reference to FIGS. 6 and 7.

Figure 6:
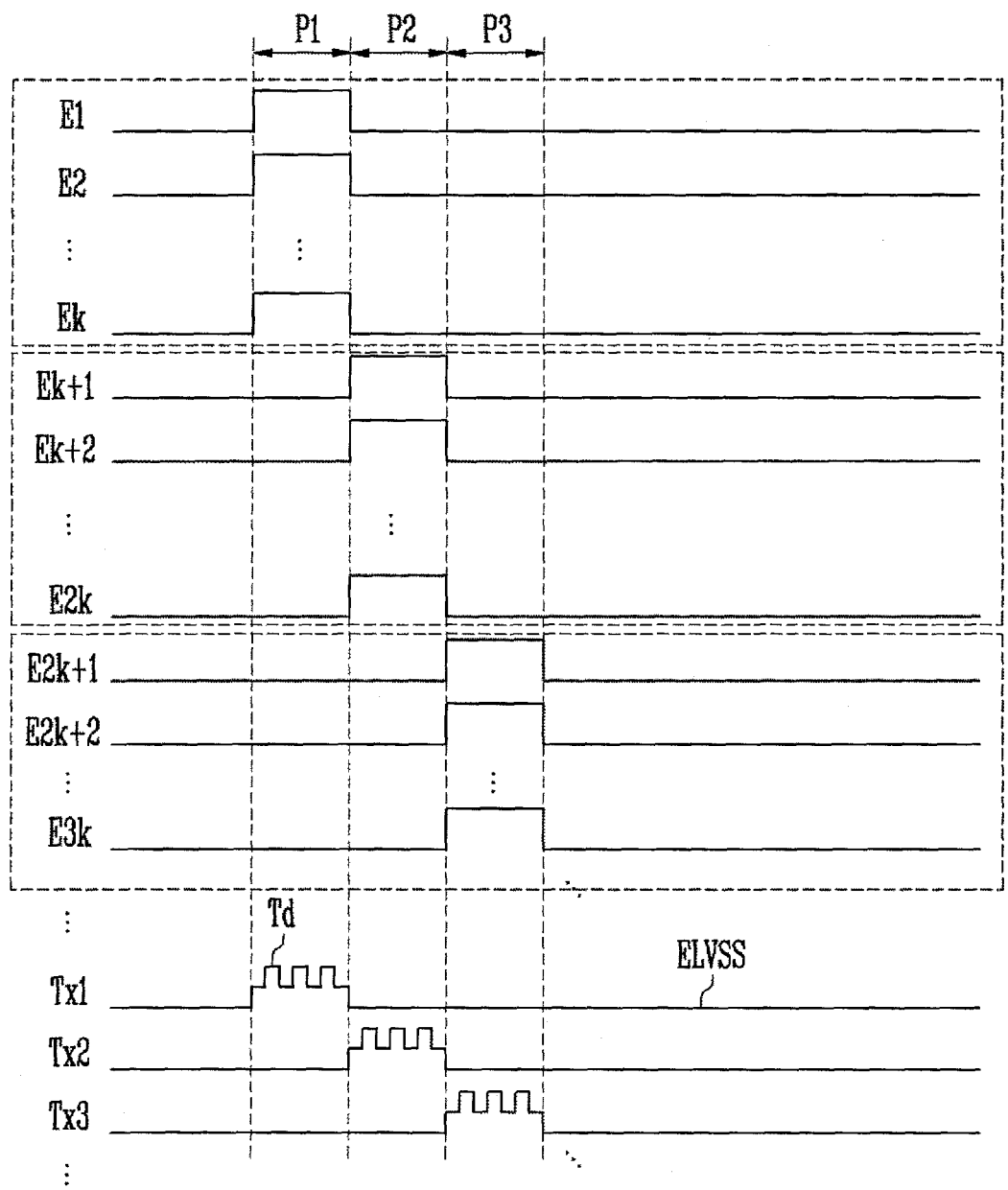
FIG. 6 is a waveform diagram illustrating a driving method of the display device integrated with the touch screen panel, according to another example embodiment of the present invention.

FIG. 6 is a waveform diagram illustrating a driving method of the display device integrated with the touch screen panel, according to another embodiment of the present invention. FIG. 7 is a waveform diagram illustrating a driving method of the display device integrated with the touch screen panel, according to a further embodiment of the present invention. For convenience, in descriptions of FIGS. 6 and 7, components identical or similar to those of FIG. 5 are designated by like reference numerals, and their detailed descriptions will not be provided.

Figure 7:
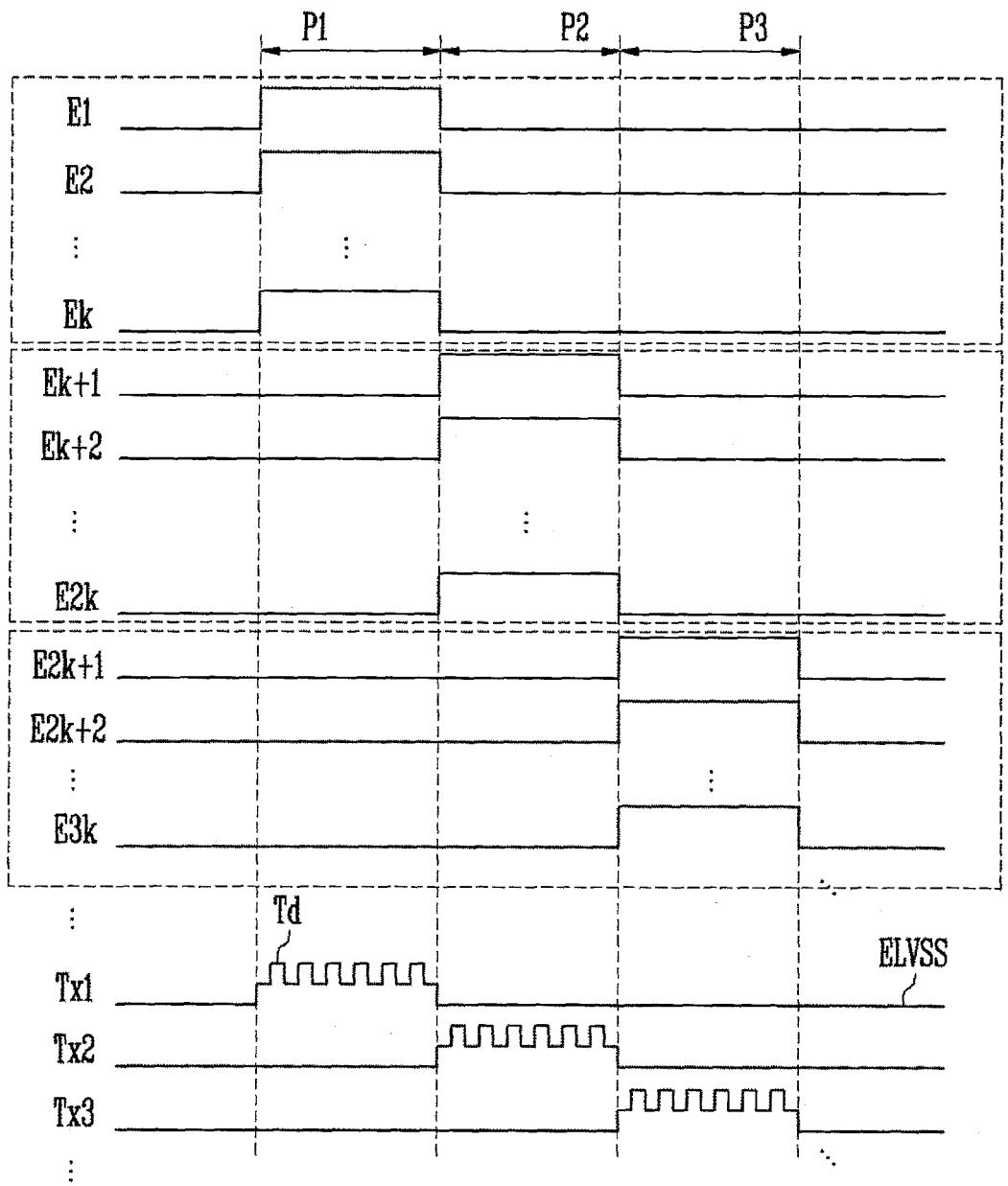
FIG. 7 is a waveform diagram illustrating a driving method of the display device integrated with the touch screen panel, according to a further example embodiment of the present invention.

Referring to FIGS. 6 and 7, the same emission control signal is concurrently or simultaneously supplied to emission control lines E1 to Ek, Ek+1 to E2k, . . . arranged on the region in which the same first touch electrode Tx is formed among the emission control lines E1, E2, . . . .

That is, the emission control signal may not be sequentially supplied to each emission control line E1, E2, . . . , rather, it may be sequentially supplied to the emission control lines E1 to Ek, then Ek+1 to E2k, then . . . for each first touch electrode Tx.

To this end, for example, the emission control lines E1 to Ek, Ek+1 to E2k, . . . arranged on the region in which the same first touch electrode Tx is formed among the emission control lines E1, E2, . . . may be electrically coupled to one another.

In the embodiment shown in FIG. 6, the width (or period) of emission control signals may be decreased so that the emission control signal is supplied during only the touch driving periods P1, P2, P3, . . . of FIG. 5, i.e., during the touch driving periods P1, P2, P3, . . . in which the emission control signals of FIG. 5 are overlapped with each other for each first touch electrode Tx. In this embodiment, the decreased width (or period) of the emission control signals is set to allow sufficient time for writing a data signal while sequentially selecting pixels coupled to the corresponding emission control lines E1 to Ek, Ek+1 to E2K, . . . for each horizontal line through a scan signal.

In the embodiment shown in FIG. 6, the width (or period) of the emission control signals is decreased while maintaining the time when each touch driving period (P1, P2 or P3) is maintained to be identical or similar to that in the embodiment shown in FIG. 5, and the decreased width (or period) of the emission control signals is used as the emission time of pixels, thereby improving luminance.

In the embodiment shown in FIG. 7, the width (or period) of the emission control signals is maintained to be identical or similar to that in the embodiment shown in FIG. 5. However, in the embodiment shown in FIG. 7, the same emission control signal is concurrently or simultaneously supplied to the emission control lines E1 to Ek, Ek+1 to E2k, . . . arranged on the region in which the same first touch electrode Tx is formed, so that all the non-emission periods in which the emission control signal is supplied can be used as the touch driving periods P1, P2, P3, . . . . Accordingly, more touch driving time is secured or allotted, thereby improving the sensitivity of the touch screen panel.

By way of summation and review, if a separately manufactured touch screen panel is attached to an outer face of a display device, the entire thickness of the display device is increased, and the visibility of an image is deteriorated. In addition, the processing time and manufacturing cost of the display device are increased.

According to an embodiment of the present invention, it is possible to provide a display device integrated with a touch screen panel, in which pixel electrodes provided in pixels for the purpose of displaying an image are patterned to be used as touch electrodes for implementing the touch screen panel, thereby simplifying the structure of the display device.

Further, the presence and position of a touch input are sensed by sequentially supplying a touch driving signal to the touch electrodes, and a pixel power source is supplied to the other touch electrodes, except for a touch electrode receiving the touch driving signal during a corresponding period, among the touch electrodes. In this manner, the other touch electrodes serve as pixel electrodes, thereby concurrently or simultaneously driving the touch screen panel during the period in which an image is displayed. Accordingly, it is possible to improve or increase efficiency of time utilization and to secure sufficient driving time, thereby stably driving the touch screen panel.

Example embodiments have been disclosed herein, and although specific terms are employed, they are used, and are to be interpreted, in a generic and descriptive sense only and not for purpose of limitation. In some instances, as would be apparent to one of ordinary skill in the art as of the filing of the present application, features, characteristics, and/or elements described in connection with a particular embodiment may be used individually or in combination with features, characteristics, and/or elements described in connection with other embodiments unless otherwise specifically indicated. Accordingly, it will be understood by those of ordinary skill in the art that various suitable changes in form and details may be made without departing from the spirit and scope of the present invention as set forth in the following claims, and equivalents thereof.

What is claimed is:

1. A display device integrated with a touch screen panel, comprising:
   a display unit in which scan lines and data lines crossing each other, and a plurality of pixels are arranged, wherein the plurality of pixels are positioned at crossing regions of the scan lines and the data lines and each of the plurality of pixels comprises first and second pixel electrodes;

first touch electrodes extending along a first direction on the display unit;

second touch electrodes extending along a second direction on the display unit, and arranged to overlap the first touch electrodes, the second touch electrodes being spaced apart from the first touch electrodes; and emission control lines extending in parallel with the scan lines, wherein the first touch electrodes are implemented by patterning the second pixel electrode in the first direction, wherein while a touch driving signal is supplied to one or more first touch electrodes among the first touch electrodes, a second pixel power source is supplied to remaining first touch electrodes of the first touch electrodes, and wherein, during at least a period in which the touch driving signal is supplied, adjacent ones of the emission control lines arranged at a region, in which the one or more first touch electrodes are formed, are to concurrently control corresponding first ones of the plurality of pixels to turn off while other ones of the emission control lines are to control corresponding second ones of the plurality of pixels to turn on.

2. The display device of claim 1, wherein the emission control lines coupled to the pixels at a region in which a same one of first touch electrode of the first touch electrodes receiving the touch driving signal is disposed, supply, to the pixels, emission control signals for controlling the pixels not to emit light during at least a period in which the touch driving signal is supplied.

3. The display device of claim 1, wherein the first touch electrodes extend along a same direction as the scan lines and the emission control lines, and wherein the first touch electrodes overlap with a plurality of pixel lines on which the scan lines and the emission control lines are arranged.

4. The display device of claim 3, wherein emission control signals for controlling the pixels not to emit light are sequentially shifted and supplied to the emission control lines, and wherein the emission control signals supplied to the emission control lines arranged at a region in which a same one of the first touch electrodes is formed are supplied to be partially overlapped in time, with each other, during at least a period in which the touch driving signal is supplied to the same one of the first touch electrode.

5. The display device of claim 3, wherein the emission control lines arranged at the region in which a same one of the first touch electrodes is formed are electrically coupled to each other.

6. The display device of claim 1, wherein each of the pixels is configured to comprise at least one organic light emitting diode, and the first and second pixel electrodes are anode and cathode electrodes of the organic light emitting diode, respectively.

7. The display device of claim 6, wherein each of the anode electrodes is divided and patterned for each of the pixels, and each of the cathode electrodes is divided and patterned for each of the first touch electrodes.

8. The display device of claim 1, wherein a first pixel power source is supplied to a first pixel electrode, and the second pixel power source and the touch driving signal are alternately supplied to the second pixel electrode.

9. The display device of claim 1, wherein a presence and position of a touch input are sensed by detecting a change in capacitance applied to the second touch electrodes, corresponding to the touch driving signal supplied to the first touch electrodes.

10. A driving method of a display device integrated with a touch screen panel, which displays an image by using a pixel electrode provided in each pixel of a plurality of pixels as a first touch electrode for touch driving, selecting pixels of the plurality of pixels for each line while supplying a scan signal to scan lines, writing a data signal in the selected pixels while supplying the data signal to data lines when the scan signal is supplied, and controlling an emission period of the pixels while supplying emission control signals to emission control lines formed in parallel with the scan lines, the driving method comprising:

sequentially supplying a touch driving signal to first touch electrodes formed in a same direction as the scan lines and the emission control lines; and sensing a presence and position of a touch input by detecting a change in capacitance applied to second touch electrodes spaced apart from the first touch electrodes when the touch driving signal is supplied, wherein a pixel power source is supplied to the first touch electrodes, except for a subset of the first touch electrodes to which the touch driving signal is supplied, and wherein, during at least a period in which the touch driving signal is supplied, adjacent ones of the emission control lines arranged at a region, in which the subset of the first touch electrodes is formed, are to concurrently control corresponding first ones of the plurality of pixels to turn off while other ones of the emission control lines are to control corresponding second ones of the plurality of pixels to turn on.

11. The driving method of claim 10, wherein the emission control signals for controlling the pixels not to emit light through the emission control lines are supplied to the pixels at the region in which the subset of the first touch electrodes receiving the touch driving signal is formed.

12. The driving method of claim 10, wherein each of the first touch electrodes overlaps with a plurality of pixel lines on which the scan lines and the emission control lines are arranged, and wherein the emission control signals for controlling the pixels not to emit light are sequentially shifted and supplied to the emission control lines.

13. The driving method of claim 10, wherein each of the first touch electrodes overlaps with a plurality of pixel lines on which the scan lines and the emission control lines are arranged, and wherein the emission control signals for controlling the pixels not to emit light are concurrently supplied to the emission control lines arranged at a region in which a same one of the first touch electrode is formed.

* * * * *